July 23, 1946. K. F. E. SCHOENFELD ET AL 2,404,752
ENGINE
Filed Jan. 25, 1946 2 Sheets-Sheet 1

Kurt F. E. Schoenfeld,
Earl W. Fowler,
INVENTORS

BY
Victor J. Evans & Co.
ATTORNEYS

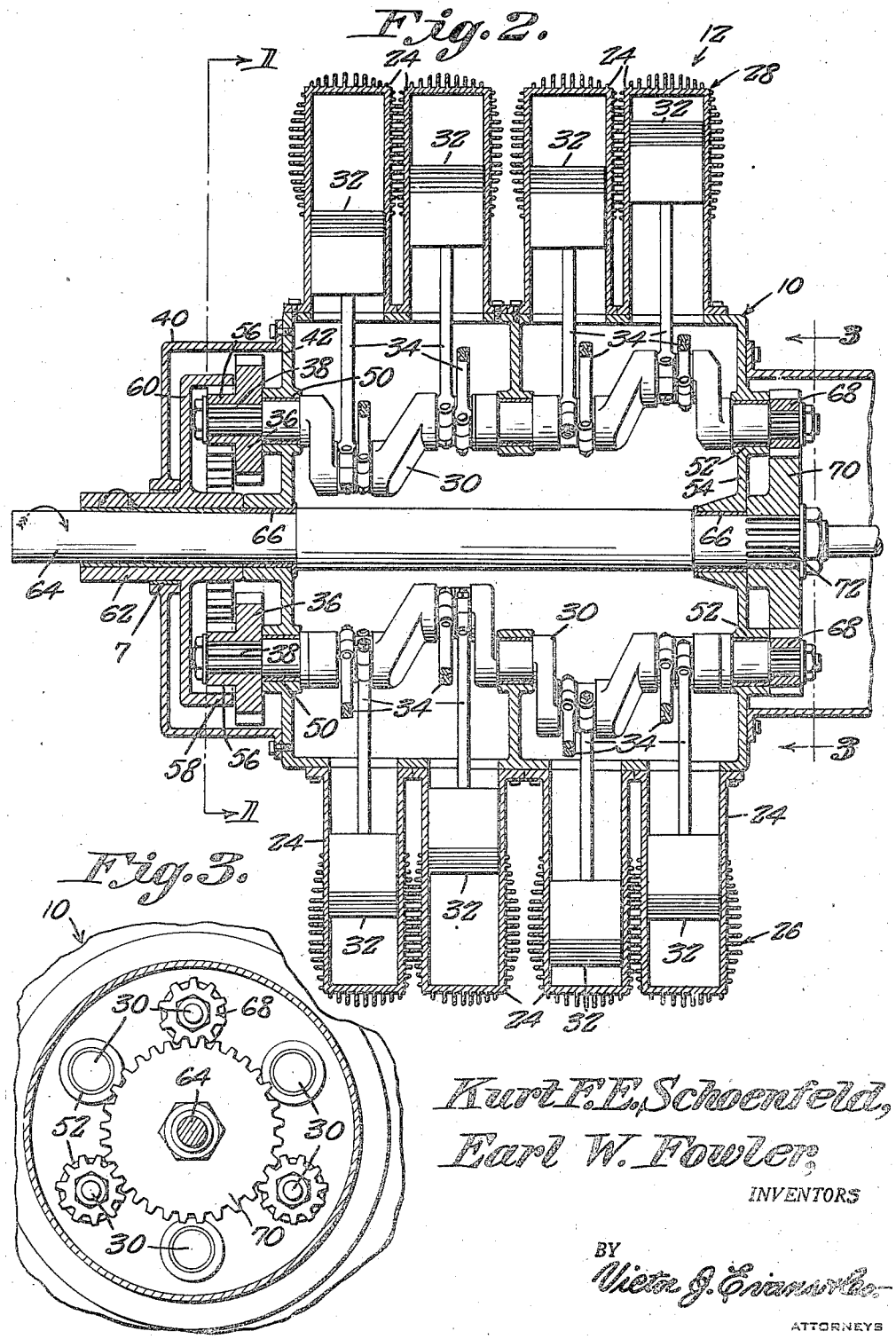

Patented July 23, 1946

2,404,752

UNITED STATES PATENT OFFICE 2,404,752

ENGINE

Kurt F. E. Schoenfeld, Stafford, Va., and Earl W. Fowler, Amherst, N. Y.

Application January 25, 1946, Serial No. 643,342

2 Claims. (Cl. 74—389)

Our invention relates to engines, and has among its objects and advantages the provision of an improved internal combustion engine of a combination radial and in line features designed to facilitate the manufacture of aircraft engines of this type by modern production methods, in which the engine embodies two power take-off connections to operate propellers in tandem, wherein the connections are rotated in opposite directions for torque balancing purposes, and in which a plurality of crankshafts are employed and arranged for rotation in opposite directions successively to further secure balanced torque, each crankshaft serving two in line banks of cylinders.

In the accompanying drawings:

Figure 2 is a view taken substantially along the line 2—2 of Figure 1; and

Figure 3 is a view taken substantially along the line 3—3 of Figure 2.

Figure 1:
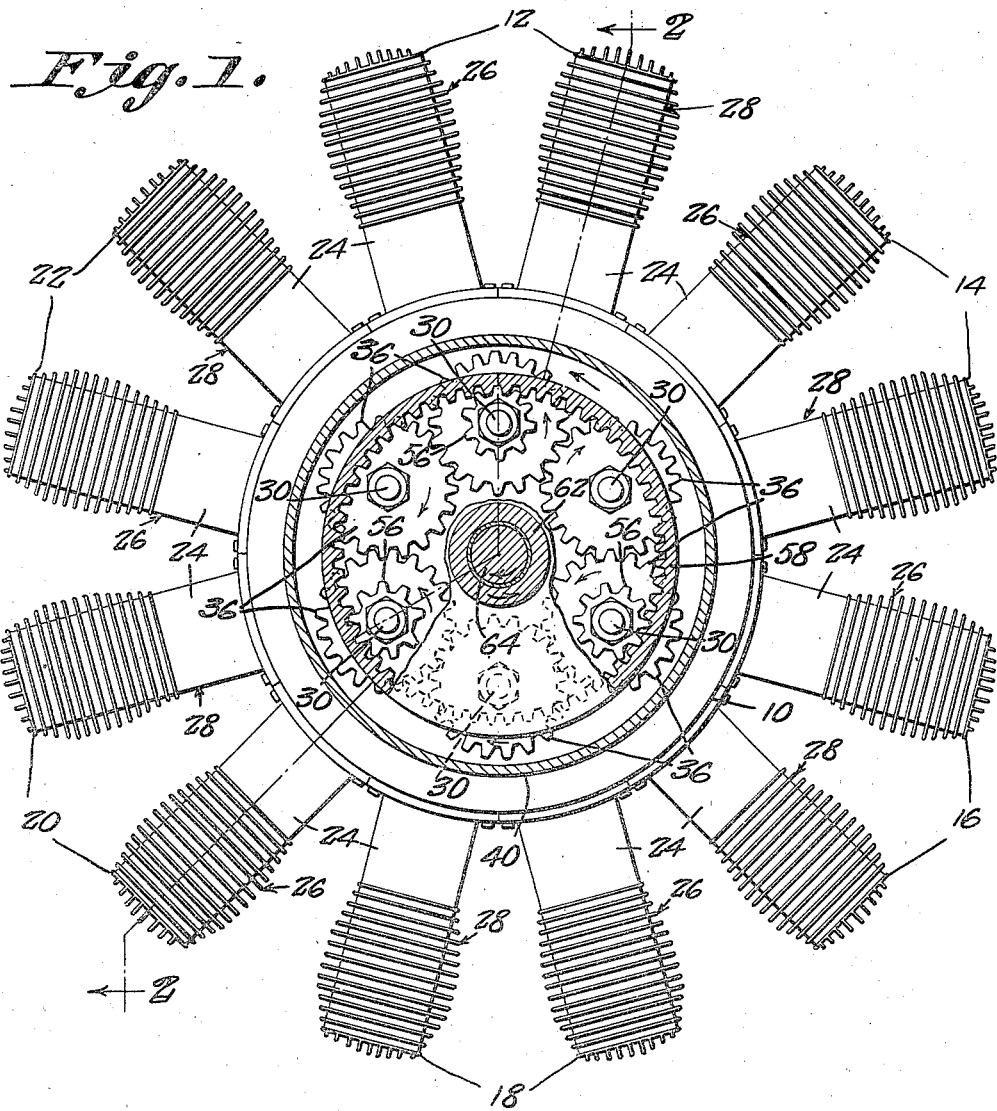
Figure 1 is a view taken substantially along the line 1—1 of Figure 2.

In the embodiment selected for illustration, we make use of a crankcase 10 to which a plurality of banks 12, 14, 16, 18, 20 and 22 of cylinders 24 are attached. This engine, when viewed according to Figure 1, is of the radial type, with the banks 12 through 22 each comprising two rows 26 and 28 of the cylinders 24. The cylinders in each row are arranged in a straight line, with all the rows spaced at equal intervals circumferentially of the engine and in planes paralleling and passing through the longitudinal axis of the engine.

A crankshaft 30 is provided for each bank 12 through 22, the pistons 32 of the cylinders 26 and 28 in each bank being connected with its crankshaft 30 by the usual connecting rods 34. Thus each bank and its crankshaft is in the nature of a V-type engine.

To the forward end of each crankshaft is fixedly secured a gear 36, as by a splined connection 38 for strength, the gears 36 meshing one with the other in a closed circular alignment, as shown in Figure 1. These gears are enclosed in a housing 40 bolted to the front end wall 42 of the crankcase. This front wall is provided with bearings 50 supporting the forward ends of the crankshafts, their rear ends being supported in bearings 52 on the rear crankcase wall 54.

Alternate gears 36 have pinions 56 secured thereto meshing with an internal ring gear 58 on a flange 60 having a sleeve 62 rotatably mounted on a rotary shaft 64 supported in bearings 66 on the end walls 42 and 54. The crankshafts 30 of the banks 12, 16 and 20 rotate counter-clockwise when viewing Figure 1, thereby imparting similar rotation to the sleeve 62, this sleeve serving as a mount for the forward propeller (not shown). Accordingly the crankshafts 30 of the banks 14, 18 and 22 rotate clockwise when viewing Figure 1.

To the rear ends of the crankshafts 30 of the banks 12, 16 and 20 are fixedly secured pinions 68 meshing with a gear 70 secured to the shaft 64, as by a splined connection 72, the pinions 68 also having strong splined connections with their respective crankshafts 30. The gear 70 is rotated reversely of the sleeve 62, so that the shaft 64 rotates clockwise when viewing Figure 1.

The shaft 64 may be extended rearwardly to any desired distance for connection with a rear propeller, in which case the forward and rearward propellers would rotate in opposite directions. In lieu of functioning as a propeller mount, the shaft 64 may serve solely as a drive for the many mechanisms necessary in an engine of this type. The housing 40 is provided with a bearing 74 for the sleeve 62.

Without further elaboration, the foregoing will so fully illustrate our invention, that others may, by applying current knowledge, readily adapt the same for use under various conditions of service.

We claim:

1. Shaft drive gearing for an engine having a power take-off shaft and a plurality of crankshafts mounted parallel with and in circularly spaced relation about the axis of the power take-off shaft, comprising a gear fixed on each crankshaft, said gears being disposed in annular arrangement and in meshing engagement, a pinion fixed on alternate crankshafts, a drive gear fixed on said power take-off shaft in mesh with and driven by said pinions, a second power take-off shaft mounted in concentric relation with the first mentioned power take-off shaft, a gear fixed on said second power take-off shaft, and drive pinions on those crankshafts carrying said first pinions disposed in mesh with the drive gear on said second power take-off shaft for driving the latter.

2. The shaft drive gearing as in claim 1, with the drive gear fixed on said second power take-off shaft having the form of an annular gear engaged about and in mesh with the pinions fixed on the said other of the crankshafts for driving said second power take-off shaft in a direction reverse to that of the first power take-off shaft.

KURT F. E. SCHOENFELD.
EARL W. FOWLER.